(12) United States Patent
Lee (10) Patent No.: US 9,083,584 B2
(45) Date of Patent: Jul. 14, 2015

(54) COMMON MODE MODULATION WITH CURRENT COMPENSATION

(71) Applicant: VIA Technologies, Inc., New Taipei (TW)

(72) Inventor: Yeong-Sheng Lee, Fremont, CA (US)

(73) Assignee: VIA TECHNOLOGIES, INC., New Taipei (TW)

( * ) Notice: Subject to any disclaimer, the term of this patent is extended or adjusted under 35 U.S.C. 154(b) by 0 days.

(21) Appl. No.: 13/968,705

(22) Filed: Aug. 16, 2013

(65) Prior Publication Data

US 2015/0049839 A1    Feb. 19, 2015

(51) Int. Cl.
 *H03B 1/00* (2006.01)
 *H03K 3/00* (2006.01)
 *H04L 25/08* (2006.01)
 *H04L 25/02* (2006.01)

(52) U.S. Cl.
 CPC .......... *H04L 25/085* (2013.01); *H04L 25/0276* (2013.01)

(58) Field of Classification Search
 USPC .......... 327/108–112, 379, 389, 391; 326/22–27, 81–87
 See application file for complete search history.

(56) References Cited

U.S. PATENT DOCUMENTS

| 6,295,323 | B1 |  | 9/2001 | Gabara |  |
| 7,405,594 | B1 | * | 7/2008 | Xu | 326/82 |
| 7,528,636 | B2 | * | 5/2009 | Huang | 327/108 |
| 7,898,295 | B1 | * | 3/2011 | Kasturirangan et al. | 326/86 |
| 2006/0091909 | A1 | * | 5/2006 | Laursen | 326/83 |
| 2007/0115030 | A1 | * | 5/2007 | Bhattacharya et al. | 326/83 |
| 2007/0279095 | A1 | * | 12/2007 | Jiang | 326/83 |
| 2008/0238521 | A1 | * | 10/2008 | Huang | 327/322 |
| 2009/0091357 | A1 | * | 4/2009 | Muniyappa et al. | 327/108 |
| 2010/0127736 | A1 | * | 5/2010 | Dixit et al. | 327/108 |

* cited by examiner

*Primary Examiner* — Brandon S Cole
(74) *Attorney, Agent, or Firm* — McClure, Qualey & Rodack, LLP (57) ABSTRACT

The present disclosure provides systems and methods for compensating channel modulation effects. Some embodiments comprise a differential switching circuit, a common mode modulation circuit, and a current compensation circuit. The current compensation circuit compensates for channel modulation effects.

15 Claims, 9 Drawing Sheets

COMMON MODE MODULATION WITH CURRENT COMPENSATION

BACKGROUND

1. Field of the Disclosure

The present disclosure relates generally to circuits and, more particularly, to data transmission circuits.

2. Description of Related Art

Increasing data demands have resulted in ongoing efforts to improve data throughput. This data demand can be seen in both wired and wireless environments, where end users are accessing increasing volumes of data, including sound, video, text, etc. In view of these demands, there are ongoing developments in the industry to improve data communications.

SUMMARY

The present disclosure provides systems and methods for compensating channel modulation effects. Briefly described, some embodiments of the system comprise a differential switching circuit, a common mode modulation circuit, and a current compensation circuit. The current compensation circuit compensates for channel modulation effects.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Data users are demanding increasing functionality from their mobile devices, including high definition video. Consequently, video output has become an important feature for many smartphone systems. Currently, High Definition Multi Interface (HDMI) is used for personal computers (e.g., notebook computers, desktop computers, etc.) to connect to a television. However, the HDMI interface includes nineteen (19) pins, which is somewhat cumbersome for smaller systems such as smartphone systems. In an effort to accommodate these smaller devices and systems, a new video standard known as Mobility High-definition Link (MHL) has been implemented. The MHL interface uses only five (5) pins, thereby accommodating smaller devices.

However, due to the reduction in the number of pins, the MHL standard results in combining multiple functions into a single pin. In other words, since the 5-pin MHL interface now performs the previous functions of the 19-pin HDMI interface, multiple functions are integrated into fewer numbers of pins. For example, in HDMI, the data signal and the clock signal are carried on different channels. However, in MHL, the data signal and the clock signal are integrated into a single pair of pins, with the data channel remaining the same but the clock signal being replaced by a common mode modulation (CMM) scheme.

One consequence of implementing a CMM scheme is that the resulting signal toggles with the clock signal. In other words, since the same pin is carrying both the data signal and the clock signal, the combination of the two signals results in toggling effect that follows the clock cycle. If complementary metal oxide semiconductor (CMOS) technology is used to implement current sources in these MHL systems, then those transistors in the current sources exhibit a channel modulation effect according to the following current law:

$$I = K(VGS-VT)^2(1+\lambda(VDS))$$ [Eq. 1], with $\lambda$ representing a channel modulation factor, VT representing a threshold voltage, K representing the transconductance parameter, VGS representing the voltage difference between the gate and source, and VDS representing the voltage difference between the source and drain.

Due to the channel modulation effect, the resulting current becomes non-constant, and consequently the peak-to-peak output voltage tracks the non-constant behavior of the current. This non-constant behavior manifests itself as increased noise at the receiver, thereby compromising data integrity.

In order to mitigate this problem, the various embodiments described herein provide an approach to compensating for this channel modulation effect. Briefly described, some embodiments of the system comprise a differential switching circuit, a common mode modulation circuit, and a current compensation circuit, where the current compensation circuit compensates for channel modulation effects. By compensating for the channel modulation effects, the described embodiments reduce the non-constant behavior of the current and, consequently, reduce the apparent noise at the receiver.

With this overview in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1:
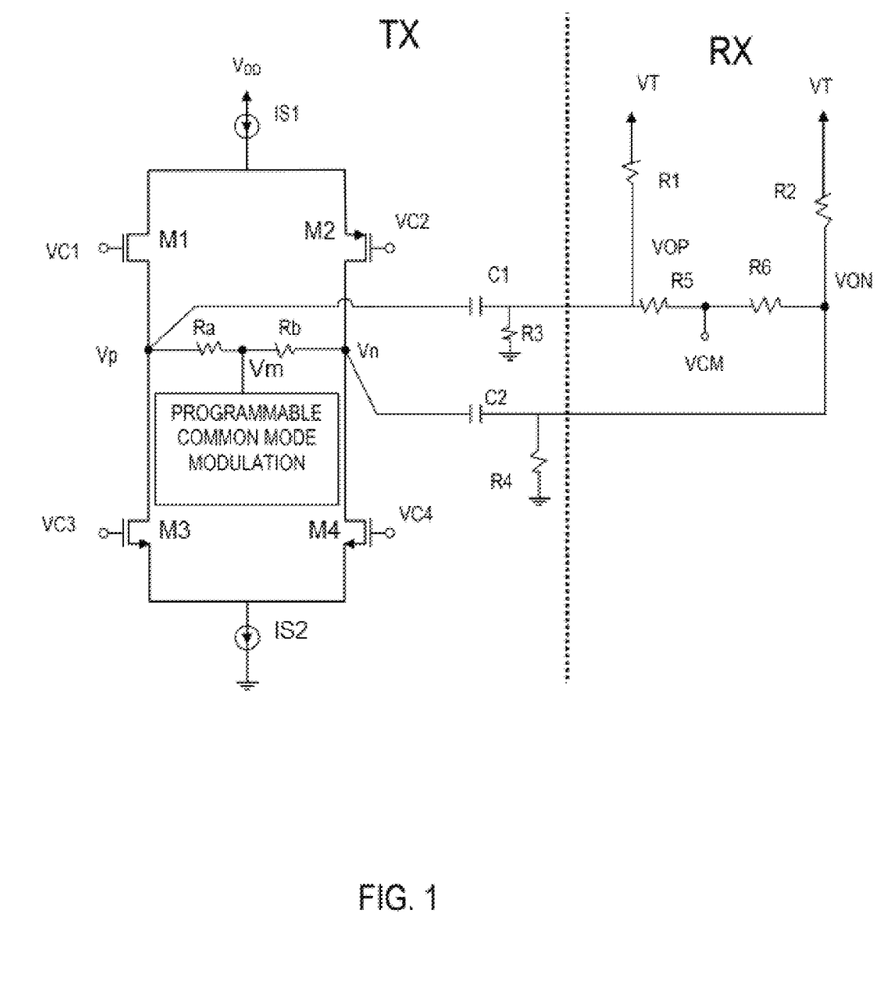
FIG. 1 is a circuit diagram showing one embodiment of a common mode modulation driver circuit.

FIG. 1 is a diagram showing one embodiment of a driver circuit, where both a transmitter side (TX) and a receiver side (RX) are shown. The TX comprises a common mode modulation (CMM) driver circuit with a first current source (IS1), a second current source (IS2), and two resistors (Ra and Rb). IS1 is electrically coupled to VDD, while IS2 is electrically coupled to ground. For some embodiments, the IS1=IS2=10 mA and Ra=Rb=50 ohms. Transistors (M1, M2, M3, and M4) are operatively coupled to IS1, IS2, Ra, and Rb to form a differential switching circuit. Specifically, M1 is positioned between IS1 and Ra, M2 is positioned between IS1 and Rb, M3 is positioned between IS2 and Ra, and M4 is positioned between IS2 and Rb. Thus, M1, Ra, and M3 converge at one node (which carries Vp), while M2, Rb, and M4 converge at another node (which carries Vn). Ra and Rb are connected together at a node that carries the common mode signal (Vm). A programmable common mode modulation (PCMM) circuit is used to generate Vm, which carries the clock signal. The differential signal pair Vp–Vn carries the data signal.

The RX comprises four resistors (R3, R4, R5, and R6), which are used for receiver termination and common mode impedance. For some embodiments, R3=R4=60 ohms, while R5=R6=300 ohms. The top of R3 and the bottom of R4 are connected to termination voltages VT, which, for some embodiments, is 3.3V. Two blocking capacitors (C1 and C2) prevent VT from leaking through when internal power is off. At the RX, the data signal is carried by Vop and Von, while the clock signal is carried by Vcm.

Figure 3:
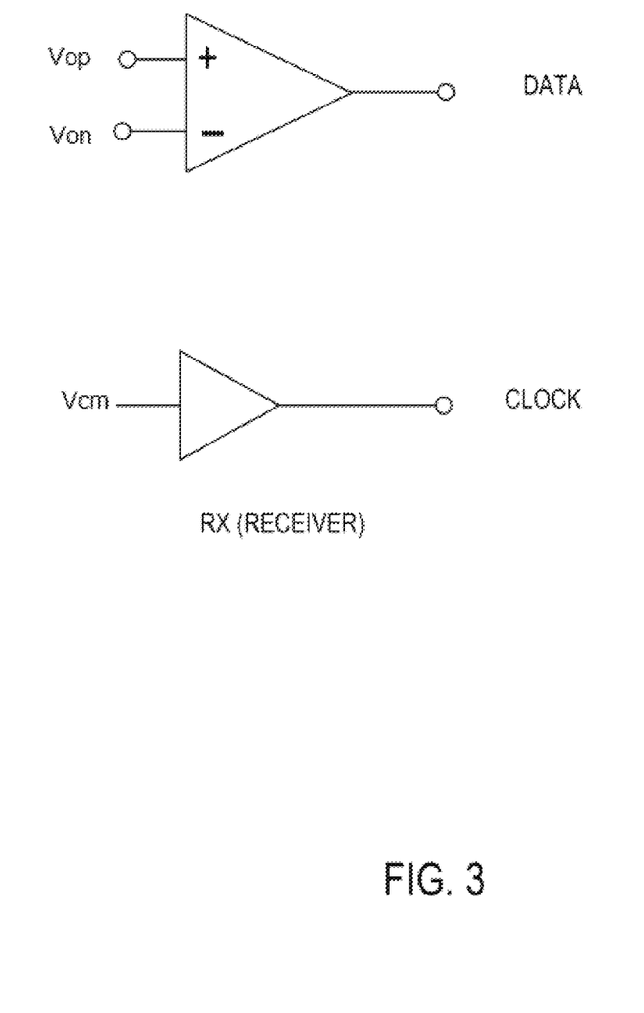
FIG. 3 shows one embodiment of a circuit for generating data signals and clock signals.

FIG. 3 shows one embodiment of a circuit for generating data signals and clock signals. Since such data-generating circuits and clock-generating circuits are known in the art, further discussion of FIG. 3 is omitted here.

Figure 2A:
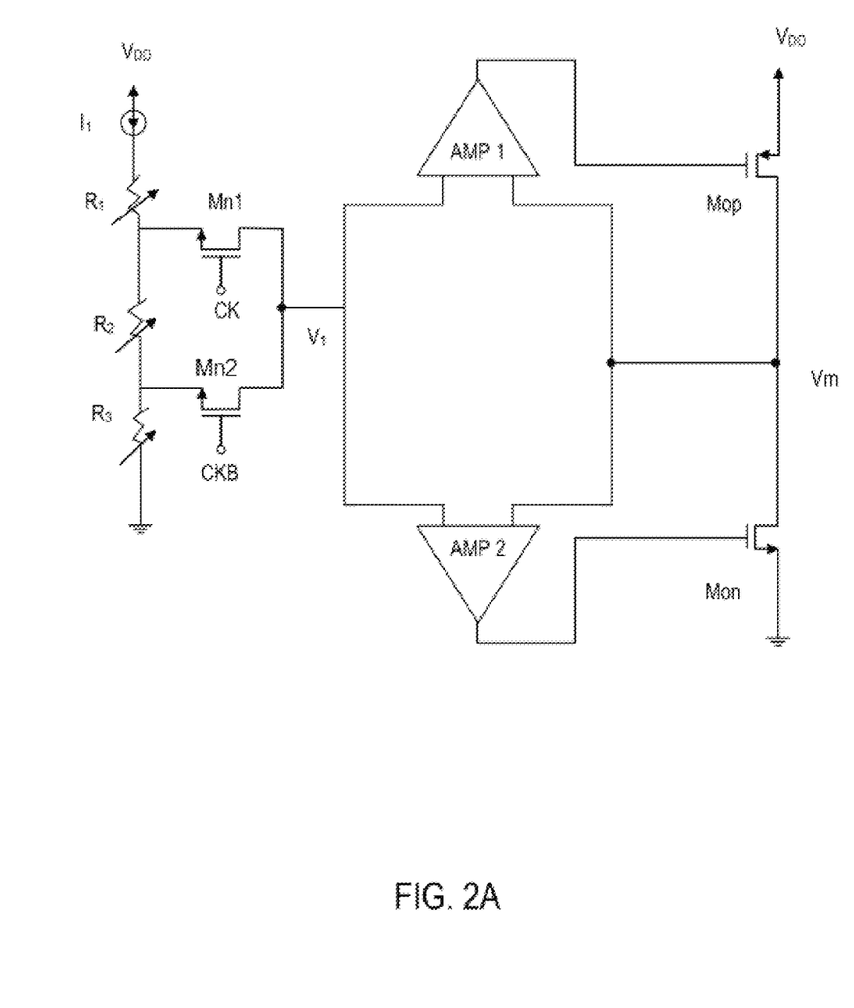
FIG. 2A is a circuit diagram showing one embodiment of a programmable common mode modulation (PCMM) circuit.

FIG. 2A is a circuit diagram showing one embodiment of a programmable common mode modulation (PCMM) circuit. As shown in FIG. 2A, the PCMM comprises a current source (I1), a first variable resistor (R1), a second variable resistor (R2), and a third variable resistor (R3), all of which are serially connected between a voltage source (VDD) and ground. The PCMM further comprises a first switch (Mn1) coupling the voltage between R1 and R2 to V1 according to CK, and a second switch (Mn2) coupling the voltage between R2 and R3 to V1 according to CKB. The CK signal is the clock signal corresponding to the data signal, the CKB signal is the inverse of the CK signal, and the input voltage V1 is generated according to CK and CKB. Given the configuration of FIG. 2A, V1 can be controlled using R1, R2, and R3.

FIG. 2A further shows differential amplifiers (AMP1 and AMP2), with V1 being electrically coupled to one positive input of AMP1 and one positive input of AMP2. The negative inputs of AMP1 and AMP2, respectively, are coupled to a node that carries Vm. Given the nature of differential amplifiers, which exhibit virtual short circuits at their inputs, Vm will closely track V1. Continuing with FIG. 1A, the outputs of AMP1 and AMP2 drive the output stages formed by Mop and Mon, respectively. Mop and Mon are positioned between VDD and ground, thereby providing a driving current. The programmability of V1, resulting from the ability to control variable resistors R1, R2, and R3, permits control of the high level and low level of V1, thereby allowing for symmetry between Vp and Vn.

Figure 2B:
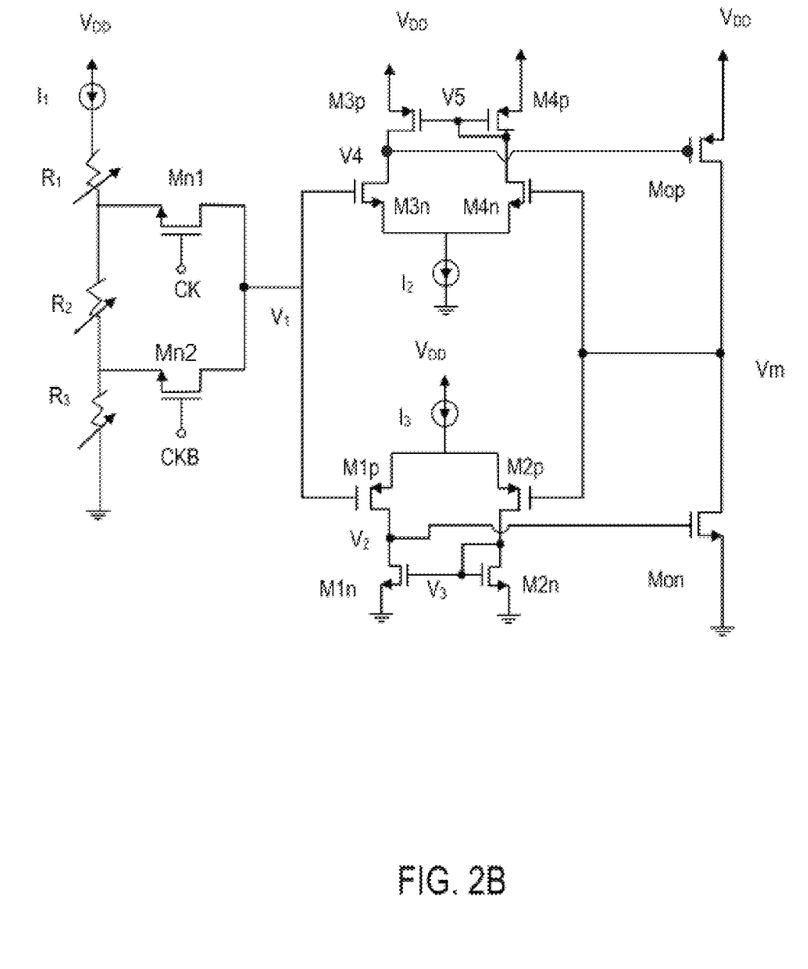
FIG. 2B is a circuit diagram showing another embodiment of a PCMM circuit.

FIG. 2B is a circuit diagram showing another embodiment of a PCMM circuit, showing with greater detail AMP1 and AMP2 being implemented with transistors. Specifically, as shown in FIG. 2B, AMP1 comprises transistors M1$p$, M2$p$, M1$n$, and M2$n$, which in combination produce the low-level of the V1 voltage. AMP2 comprises transistors M3$p$, M4$p$, M3$n$, and M4$n$, which in combination produce the high-level of the V1 voltage. In the particular configuration of FIG. 2B, output voltages V4 and V2 are used to drive Mop and Mon, respectively. Although a specific configuration is shown in FIG. 2B for the differential amplifiers, it should be appreciated that any common configuration for differential amplifiers may be used.

Figure 5:
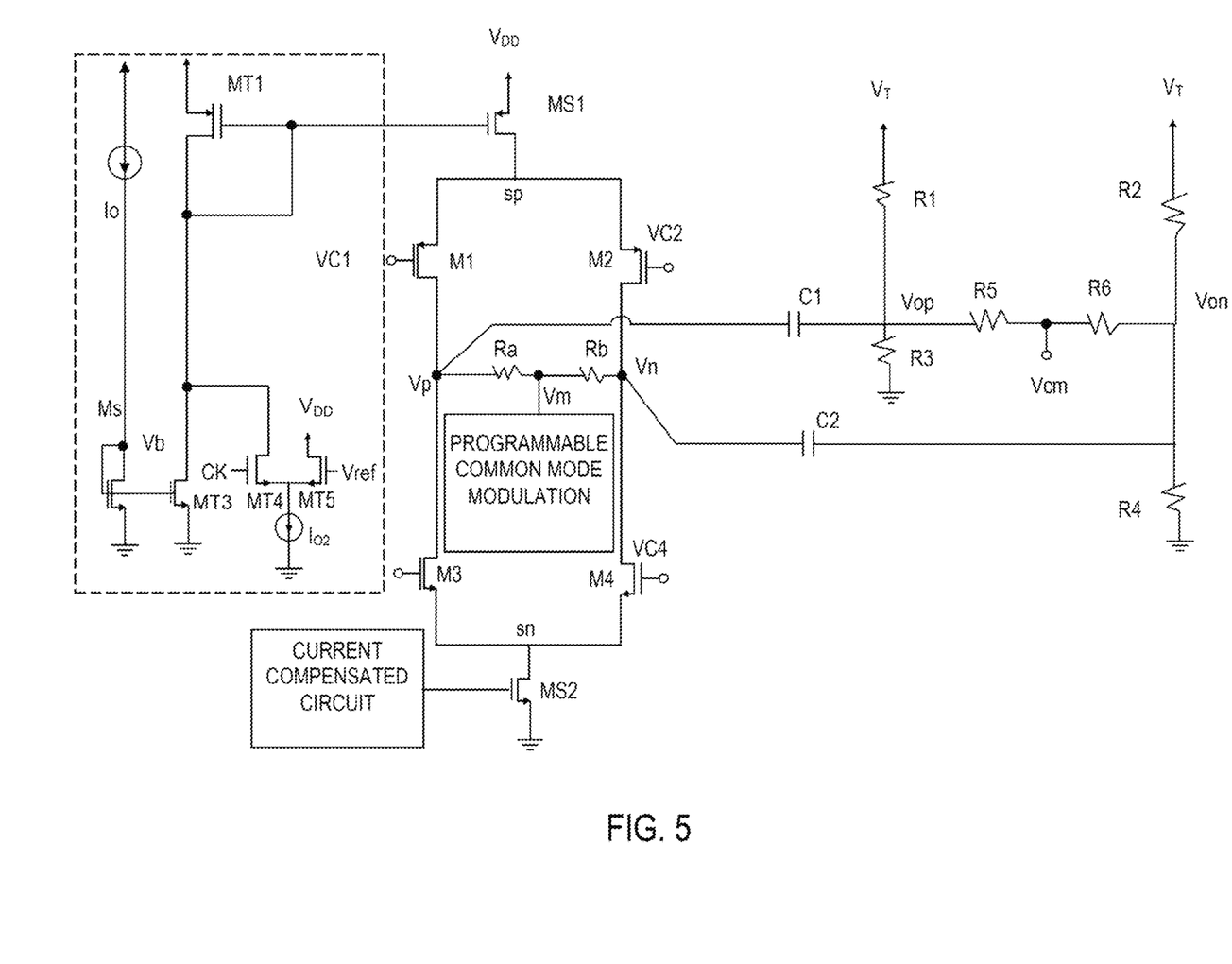
FIG. 5 is a circuit diagram showing another embodiment of a common mode modulation circuit with current compensation.
Figure 6:
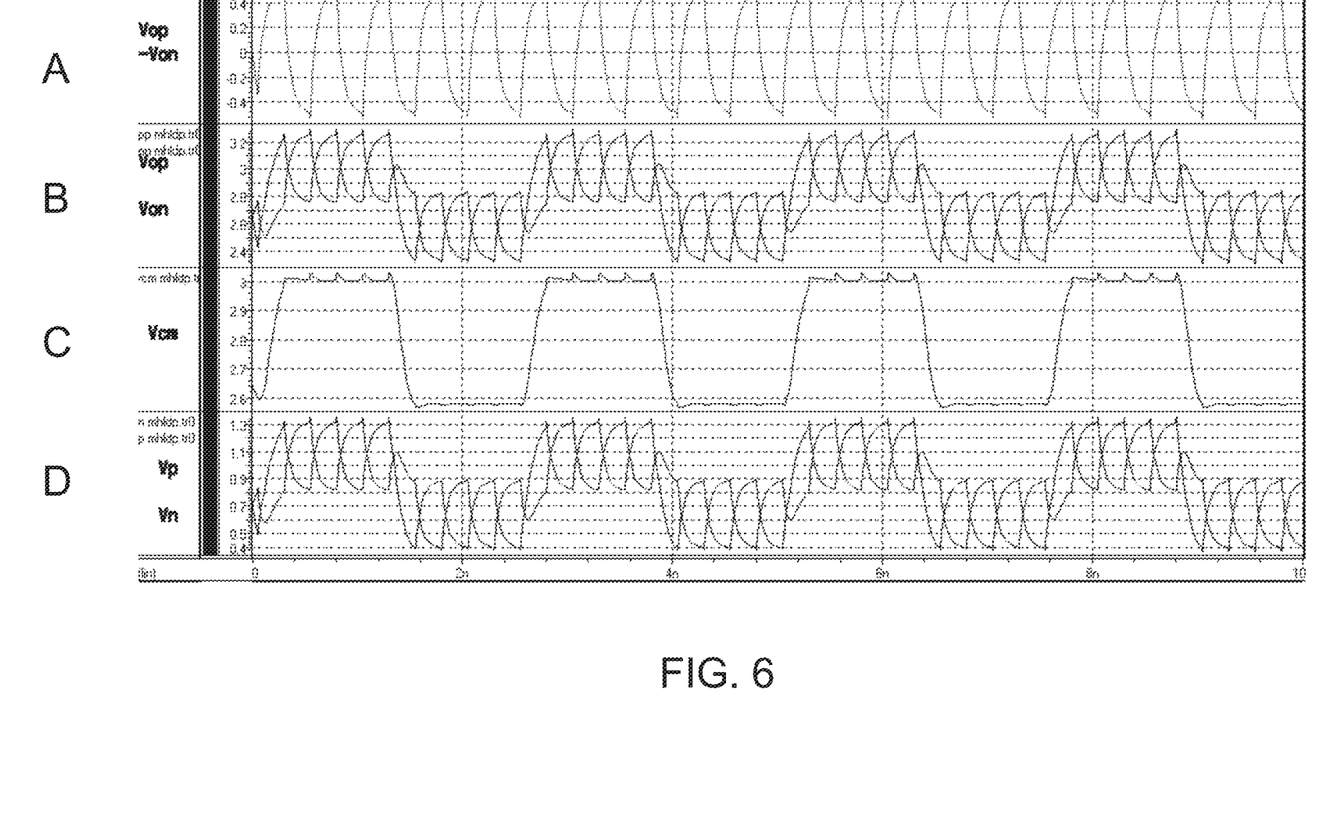
FIG. 6 is a graph showing a clock signal and various data signals that result from one embodiment of a common mode modulation circuit.

Before continuing, it is worthwhile to examine the signal behavior of the circuit of FIG. 1. In one embodiment, FIG. 6 shows the resulting clock signal and various data signals. Specifically, FIG. 6A shows the differential signal pair (Vop–Von), which carries the data signal, FIG. 6B shows Vop and Von separately, FIG. 6C shows Vcm, which carries the clock signal, and FIG. 6D shows Vp and Vn separately. As described earlier, since the data signal and the clock signal are carried on a single pin set for the MHL interface, the CMM scheme that is used to carry the data signal and the clock signal exhibits a toggling effect (FIGS. 6B and 6D). This toggling effect provides a frame of reference for the description of the current compensation scheme, which is shown in FIGS. 4 and 5.

Figure 4:
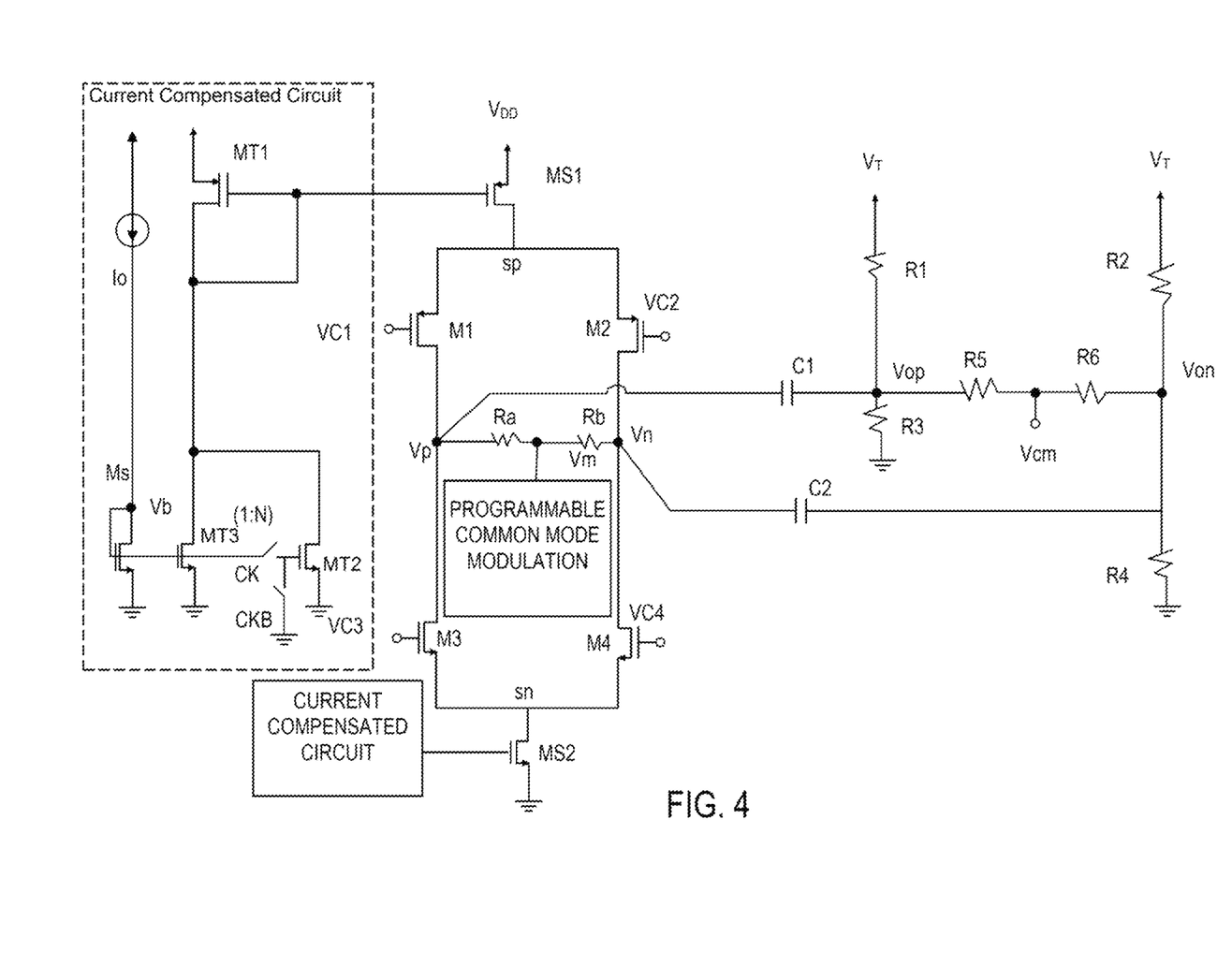
FIG. 4 is a circuit diagram showing one embodiment of a common mode modulation circuit with current compensation.

FIG. 4 is a circuit diagram showing one embodiment of a common mode modulation circuit with current compensation. As shown in FIG. 4, the TX of FIG. 1 is supplemented with two current compensation circuits. The first current compensation circuit, shown in the dashed box, adjusts IS1 (at node sp), while the second compensation circuit (shown as the solid box) adjusts IS2 (at node sn). Since the two current compensation circuits are similar, with only CK being interchanged for CKB and the sourcing current mirror changed to a sinking current mirror in the IS1 compensation circuit and the IS2 compensation circuit, respectively, only the description of the IS1 compensation circuit is provided herein.

As shown in FIG. 4, the IS1 compensation circuit comprises a current source (Io), transistors (Ms, MT1, MT2, and MT3), and two switches controlled by clocks (CK and CKB). IS1 is implemented in FIG. 4 using transistor (MS1), for which the drain voltage is the voltage (Vsp) at node sp. Given the specific configuration shown in FIG. 4, when CK is high, the gate of MT2 is connected to bias voltage Vb, and more current is provided to MT1, which mirrors more current to current source MS1. Consequently, when the voltage (Vsp) at node sp is high (when Vm is high due to CK being high) causing Vds of MS1 to be smaller, more current is mirrored to MS1 to compensate the decrease in Vds. Conversely, when Vsp is low (when CK is low and CKB is high), the gate of MT2 is coupled to ground to turn off MT2, and less current is mirrored to MS1 to compensate the increase in Vds. Given the channel modulation effect from Eq. 1, the difference in the high and low current levels will be:

$$\text{Iss} * \lambda * \Delta \text{Vds} \qquad [\text{Eq. 2}]$$

where Iss represents the current when Vds is near zero, and ΔVds represents the difference between the two Vds levels. As a result, channel modulation effects are compensated by adjusting IS1, which reduces the apparent noise that previously exhibited itself due to the non-constant behavior of IS1 and its corresponding peak-to-peak output voltage. To avoid over-compensation or under-compensation, the ratio between the aspect ratios (1:N) of MT3 and MT2 can be pre-designed such that N is on the order of approximately:

$$\lambda * \Delta \text{Vds} \qquad [\text{Eq. 3}]$$

It should be appreciated that, although Vcm carries the clock signal, Vcm is not directly used to control the current compensation circuit of FIG. 4. Instead, the clock signal itself is used to directly control the current compensation circuit to avoid forming a closed loop in the CMM driver circuit. This is because a closed loop has a tendency to cause stability issues and may slow down the response of the CMM circuit. Insofar as typical MHL applications use data rates in the range of approximately 3 GHz, any common mode feedback may cause problems in such high speed communications. Consequently, open loop current compensation is preferred.

FIG. 5 is a circuit diagram showing another embodiment of a common mode modulation circuit with current compensation, specifically showing the switches in FIG. 4 being implemented with transistors (MT4 and MT5) and another current source (Io2). As shown in FIG. 5, the gate of MT4 is electrically coupled to CK, while the gate of MT5 is electrically coupled to a reference voltage (Vref). Again, it should be appreciated that the aspect ratios, Vref, and Io2 may all be pre-designed for optimal current compensation. As shown in FIG. 5, when CK is high, MT4 provides more current to MT1, which then mirrors more current to MS1, thereby compensating for channel modulation effects.

Figure 7:
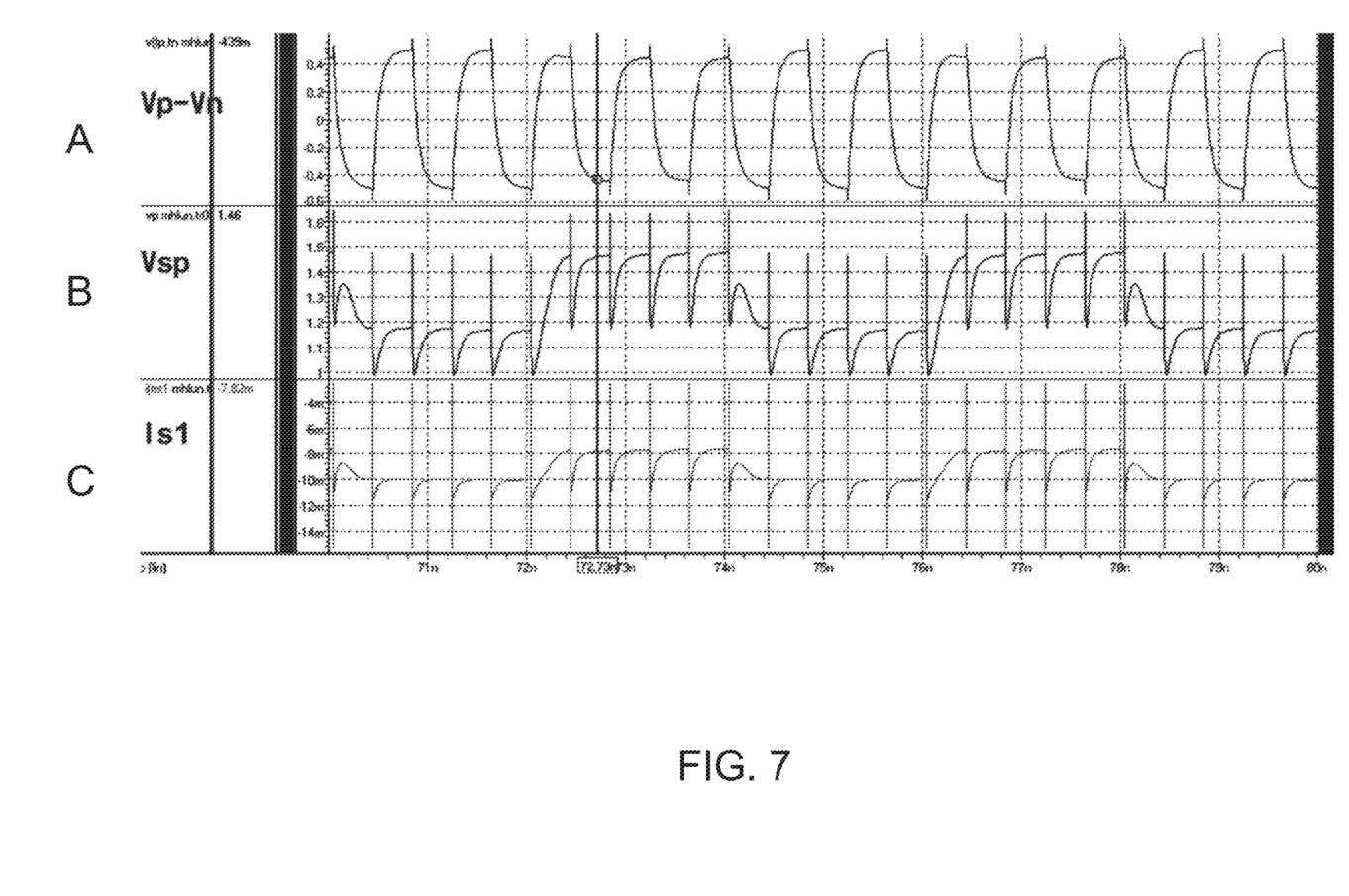
FIG. 7 is a graph showing data signals from one embodiment of a common mode modulation circuit without current compensation.
Figure 8:
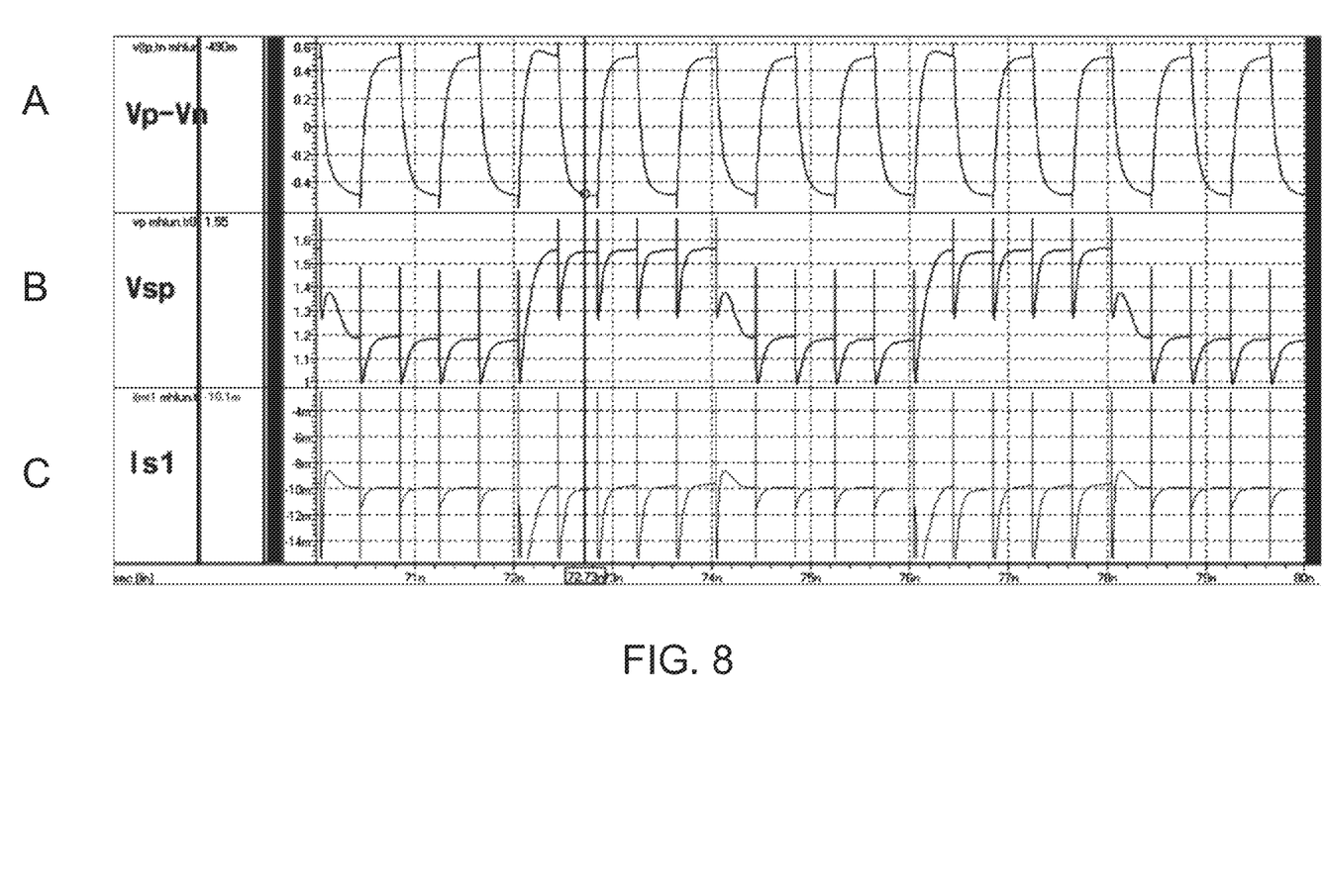
FIG. 8 is a graph showing data signals from one embodiment of a common mode modulation circuit with current compensation.

FIGS. 7 and 8 show the effects of the current compensation circuit. Specifically, FIG. 7 is a graph showing a CMM circuit without current compensation, while FIG. 8 is a graph showing a CMM circuit with current compensation. As shown in FIG. 7B, the channel modulation effect causes Vsp to toggle with the clock signal. Consequently, IS1 (FIG. 7C) exhibits an oscillatory behavior between approximately 8 mA (e.g., at 71 ns) and approximately 10 mA (e.g., at 73 ns). This oscillatory behavior in IS1 results in an apparent noise in the data signal (Vp–Vn, shown in FIG. 7C), which exhibits a peak-to-peak voltage of approximately +/−0.5V (e.g., at 71 ns) and approximately +/−0.44V (e.g., at 73 ns). In other words, the peak-to-peak voltage in the data signal shows up to a 0.06V fluctuation due to the channel modulation effect.

By contrast, the graph of FIG. 8 shows the behavior of the current compensated circuit. As shown in FIG. 8C, the IS1 shows a near-constant level of approximately 10 mA. As a result, the data signal (Vp–Vn, shown in FIG. 8C) with very little fluctuation in the peak-to-peak voltage, which consistently remains at approximately +/−0.5V.

As shown from the embodiments of FIGS. 1 through 8, providing a current compensation circuit to mitigate the channel modulation effects results in reduced apparent noise in high-speed data transmission systems.

With the detailed description of FIGS. 1 through 8 in mind, it should be appreciated that, although exemplary embodiments have been shown and described, a number of changes, modifications, or alterations to the disclosure as described may be made. All such changes, modifications, and alterations should therefore be seen as within the scope of the disclosure.

What is claimed is:

1. A digital data transmission system, comprising:
   a first current source to generate a first current;
   a second current source to generate a second current;
   a differential switching circuit, comprising:
   a first node electrically coupled to the first current source, the first node being electrically coupled to the second current source, the first node to carry a first component (Vp) of a differential signal pair (Vp–Vn), Vp being generated in response to a first electrical signal; and
   a second node electrically coupled to the first current source, the second node being electrically coupled to the second current source, the second node to carry a second component (Vn) of Vp–Vn, Vn being generated in response to the first electrical signal, a data signal being carried by Vp–Vn;
   a programmable common mode modulation circuit (PCMM) electrically coupled between the first node and the second node, the PCMM to generate a common mode signal (Vm) in response to a second electrical signal, a clock signal being carried by Vm;
   a first current compensation circuit electrically coupled to the first current source, the first current compensation circuit to adjust the first current, the first current being adjusted in response to the second electrical signal; and
   a second current compensation circuit electrically coupled to the second current source, the second current compensation circuit to adjust the second current, the second current being adjusted in response to the second electrical signal.

2. The digital data transmission system of claim 1, the channel modulation effect being compensated independently of the common mode signal.

3. A system, comprising:
   a current source;
   a differential switching circuit electrically coupled to the current source, the differential switching circuit to generate a differential signal pair;
   a common mode modulation circuit electrically coupled to the differential switching circuit, the common mode modulation circuit to generate a common mode signal in response to a second electrical signal; and
   a current compensation circuit electrically coupled to the current source, the current compensation circuit to adjust the current source in response to a mirror current, wherein the mirror current when the second electrical signal is at a high level is larger than the mirror current when the second electrical signal is at a low level, wherein the current compensation circuit further comprises:
   a first transistor comprising:
      a first transistor source coupled to ground;
      a first transistor drain coupled to the mirror current; and
      a first transistor gate; and
   a second transistor comprising:
      a second transistor source coupled to a third current source;
      a second transistor drain coupled to the mirror current; and
      a gate responsive to the second electrical signal.

4. The system of claim 3, the differential switching circuit comprising:
   a first node electrically coupled to the current source, the first node to carry a first component of the differential signal pair, the first component of the differential signal pair being generated in response to a first electrical signal; and
   a second node electrically coupled to the current source, the second node to carry a second component of the differential signal pair, the second component of the differential signal being generated in response to the first electrical signal.

5. The system of claim 4, the differential signal pair to carry a data signal.

6. The system of claim 4, the common mode modulation circuit being electrically coupled between the first node and the second node, the common mode modulation circuit to generate a common mode signal in response to a second electrical signal.

7. The system of claim 6, the common mode signal to carry a clock signal.

8. The system of claim 3, the common mode modulation circuit comprising:
   a first variable resistor;
   a second variable resistor;
   a third variable resistor;
   a first clock electrically coupled between the first variable resistor and the second variable resistor;

a second clock electrically coupled between the second variable resistor and the third variable resistor, the first clock and the second clock generating a voltage at a first input node;

a first differential amplifier, comprising:
a first differential input electrically coupled to the first input node;
a second differential input electrically coupled to a common mode signal node; and
a first output electrically coupled to a gate of a first transistor; and a second differential amplifier, comprising:
a third differential input electrically coupled to the first input node;
a fourth differential input electrically coupled to the common mode signal node; and
a second output electrically coupled to a gate of a second transistor, the common mode signal node being located between the first transistor and the second transistor.

9. A data transmission circuit, comprising:
a first current source;
a second current source;
a differential switching circuit electrically coupled to the first current source, the differential switching circuit electrically coupled to the second current source, the differential switching circuit to generate a differential signal pair;
a common mode modulation circuit electrically coupled to the differential switching circuit, the common mode modulation circuit to generate a common mode signal in response to a second electrical signal;
a first current compensation circuit electrically coupled to the first current source, the first current compensation circuit to adjust the first current source in response to a first mirror current, wherein the first mirror current when the second electrical signal is at a high level is larger than the first mirror current when the second electrical signal is at a low level; and
a second current compensation circuit electrically coupled to the second current source, the second current compensation circuit to adjust the second current source in response to a second mirror current, wherein the second mirror current when the second electrical signal is at the low level is larger than the second mirror current when the second electrical signal is at the high level.

10. The data transmission circuit of claim 9, the differential switching circuit comprising:
a first node electrically coupled to the first current source, the first node being electrically coupled to the second current source, the first node to carry a first component of the differential signal pair, the first component of the differential signal pair being generated in response to a first electrical signal; and
a second node electrically coupled to the first current source, the second node being electrically coupled to the second current source, the second node to carry a second component of the differential signal pair, the second component of the differential signal being generated in response to the first electrical signal.

11. The data transmission circuit of claim 10, the differential signal pair to carry a data signal.

12. The data transmission circuit of claim 10, the common mode modulation circuit being electrically coupled between the first node and the second node, the common mode modulation circuit to generate a common mode signal in response to a second electrical signal.

13. The data transmission circuit of claim 12, the common mode signal to carry a clock signal.

14. The system of claim 9, the current compensation circuit comprising:
a first transistor comprising:
a first transistor source coupled to ground;
a first transistor drain coupled to the mirror current; and
a first transistor gate; and
a second transistor comprising:
a second transistor source coupled to ground;
a second transistor drain coupled to the mirror current; and
a second transistor gate coupled to the first transistor gate when the second electrical signal is at the high level, the second transistor gate being coupled to ground when the second electrical signal is at the low level.

15. The system of claim 9, the current compensation circuit comprising:
a first transistor comprising:
a first transistor source coupled to ground;
a first transistor drain coupled to the mirror current; and
a first transistor gate; and
a second transistor comprising:
a second transistor source coupled to a third current source;
a second transistor drain coupled to the mirror current; and
a gate responsive to the second electrical signal.

* * * * *